C. HOFF.
SPRING WHEEL.
APPLICATION FILED AUG. 17, 1914.

1,139,286.

Patented May 11, 1915.

WITNESSES:
John Joseph Tighe
William Schuchardt

INVENTOR:
Charles Hoff,
by John Elias Jones,
ATTORNEY.

UNITED STATES PATENT OFFICE.

CHARLES HOFF, OF CINCINNATI, OHIO, ASSIGNOR OF ONE-HALF TO ANDREW OKER, OF CINCINNATI, OHIO.

SPRING-WHEEL.

1,139,286.	Specification of Letters Patent.	Patented May 11, 1915.

Application filed August 17, 1914. Serial No. 857,052.

*To all whom it may concern:*

Be it known that I, CHARLES HOFF, a citizen of the United States, and a resident of Cincinnati, in the county of Hamilton and State of Ohio, have invented a certain new and useful Improvement in Spring-Wheels, of which the following is a specification.

This invention relates to spring-wheels for vehicles and more especially to those wheels that have spring-spokes made of resilient strips of steel that stretch between the hub and the rim and are adapted to support the body of the vehicle in a cushioned state together with or independent of the use of the usual elliptical springs that intervene between the body and the axles, all according to the nature or weight of the load to be carried.

The object of the present invention is to provide between the hub and rim of a vehicle wheel a series of resilient spokes each of which is composed of a flat strip of steel or like material that is bent into U-shape between its opposite ends, such opposite ends being made to curve in opposite directions away from each other so that one curving arm or end is somewhat longer than the other and has a loop or eye formed at its outer extremity for engagement with a suitable clip projecting inwardly from the said rim, and so that the other curving arm or shorter end has an additional, short, reverse but shallow curve at its outer end that is adapted to engage the inner face of the long arm or spoke-proper of the next preceding resilient spoke, whereby the resiliency of the long arm of each spoke that practically forms the spoke-proper shall be braced and reinforced by the auxiliary resilient short arm of the succeeding resilient spoke and a series of radiating spokes, each composed of the long resilient arm of one spring and of the short or reinforcing auxiliary resilient arm of the next succeeding spring and extending preferably from between a pair of disks that form the hub of the wheel, are attached, as stated above, to clips extending equidistantly from the inner face of the rim that carries a rubber or other suitable tire in its outer groove or gutter.

The details of structure will be fully hereinafter described and particularly pointed out in the claim.

Figure 1:
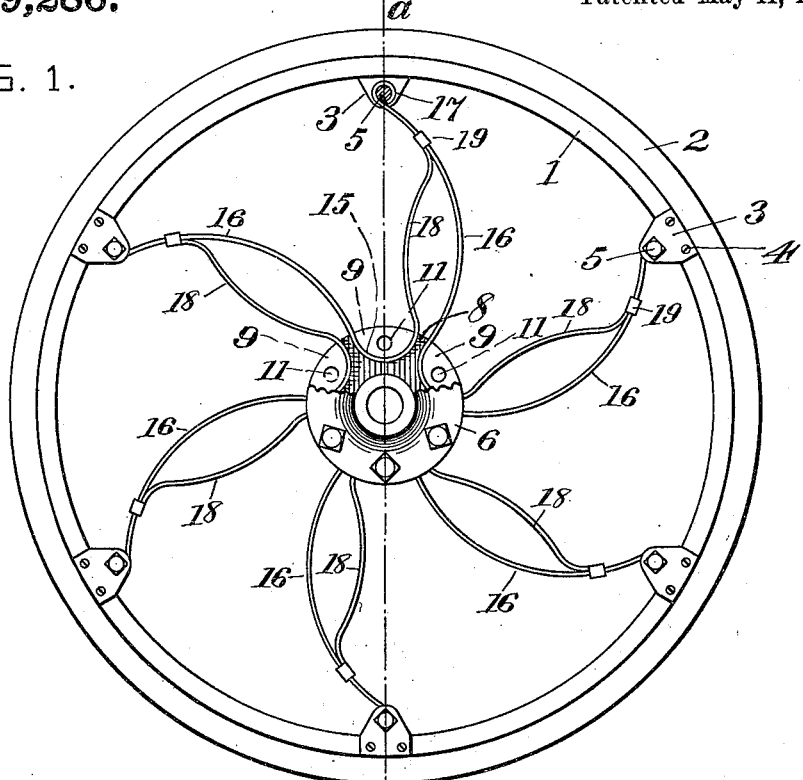
Figure 3:
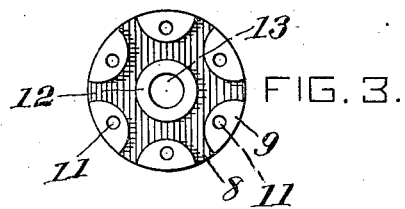
Figures 4, 5:
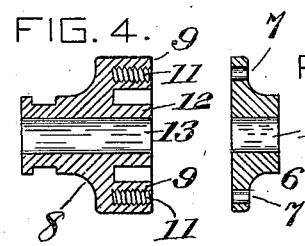
Figure 2:
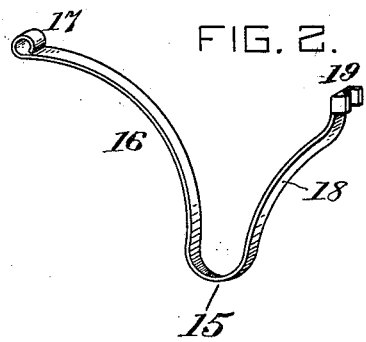

In the accompanying sheet of drawings, Figure 1 is a side elevation of the spring-wheel that embodies my invention, the upper part of the disk of the hub away from the vehicle being shown broken away to present more clearly to view the manner of attaching the intermediate U-shape portion of the springs in place on the lugs or filler-blocks that extend from the inner face of the disk of the hub toward the vehicle; Fig. 2, a perspective view of my special construction of double-armed resilient spring used in the make-up of the several spokes of the wheel; Fig. 3, a view from the inner end of one of the two disks that form the hub of my device herein set forth; Fig. 4, a vertical longitudinal section of the hub-disk seen in Fig. 3; Fig. 5, a cross-section of the hub-disk that forms a capping-member for the spring-spokes when in place in the hub.

1 indicates the wheel rim and 2 the tire carried thereby in its usual groove or channel.

3 indicates each one of a series of clips comprising a pair of alined ears that are secured by means of screws or rivets 4, equidistant, along the inner face of the rim 1 and carrying transverse bolts 5 in their inner extended ends, the purpose of which will be hereinafter referred to.

The hub of the wheel is preferably composed of an outer disk or capping member 6 having a circular series of equidistant holes or openings 7 pierced therein and an inner disk-member 8 that has a circular series of equidistant lug or filler-block formations 9 projecting from its inner face and contacting with the inner face of the disk 6 when the two disk-members are brought together in alinement for the fastening-screws 10 whose threaded shanks enter the smooth holes 7 and engage the threaded openings 11 in the inner face of the disk-member 8. A central annular projection or sleeve 12 extends from the inner face of the disk-member 8, alining with the outer face of lugs 9.

13 indicates the central orifice or bore of the hub or disk member 8, and 14 the central orifice or bore of the outer or capping disk-member 6.

Each spoke of the wheel is a resilient one and composed of a flat strip of steel or like material that is bent into U-shape at 15 between its opposite ends but not at the exact center of the strip. The long portion 16 of the strip is curved and forms the spoke-proper that extends from one of the lugs 9, (around which the said U-shape portion 15 of the strip engages within the connected disk-members), to a rim-clip 3, a loop or eye 17 being formed in the outer end thereof for engagement with a transverse bolt between the ears of the clip. The short end 18 of the steel strip is curved in a direction opposite to that of the long end 16 and its outer end bears against the concave face of the next succeeding long end or spring-proper 16 to form a reinforcing brace or auxiliary arm that has outwardly-turned lugs 19 adapted to freely engage the side edges of said next succeeding spoke-proper to prevent the auxiliary-arm 18 separating or flying away from contacting-place on its spoke when the wheel is in motion, and especially when passing over rough or jolting surfaces.

The perpendicular dotted-line $a$, $a$, is placed on Fig. 1 to indicate the degree of curvature that is assumed by a complete spoke that is composed of parts 16 and 18. The U-shape portions 15 are preferably held firmly between the disk-members so that the full resiliency of the spring-members 16 and 18 becomes effective and available in the operation of the device.

I claim:—

A spring-wheel for vehicles comprising a circular rim having a series of inwardly-extending clips, a central hub having an outer disk or cap-member and an inner disk having a circular series of duly spaced integral lugs or filler-blocks, suitable transverse screws or bolts connecting said hub disk members, and a series of pairs of integral, resilient, curved long and auxiliary short arms extending radially between said rim and hub and each having a U-shape bend intervening its said long and auxiliary short arms and adapted to engage one of said lugs in the disk-capped hub so that the long arm has its outer end attached to one of the said clips and the auxiliary short arm has free, resiliency-bearing and reinforcing contact with the long resilient arm of the next succeeding spring-spoke.

CHARLES HOFF.

Witnesses:
    JOHN ELIAS JONES,
    WILLIAM SCHUCHARDT.

Copies of this patent may be obtained for five cents each, by addressing the "Commissioner of Patents, Washington, D. C."